F. A. HART.
CALCULATING MACHINE.
APPLICATION FILED JUNE 30, 1921.

1,414,639.

Patented May 2, 1922.

WITNESSES
L. Nelson.
R H Strother.

INVENTOR
Frederick A. Hart
By Jacob Felbel
HIS ATTORNEY

UNITED STATES PATENT OFFICE.

FREDERICK A. HART, OF NEW BRITAIN, CONNECTICUT, ASSIGNOR TO REMINGTON ACCOUNTING MACHINE CORPORATION, OF NEW YORK, N. Y., A CORPORATION OF NEW YORK.

CALCULATING MACHINE.

1,414,639.     Specification of Letters Patent.     Patented May 2, 1922.

Application filed June 30, 1921. Serial No. 481,595.

*To all whom it may concern:*

Be it known that I, FREDERICK A. HART, citizen of the United States, and resident of New Britain, in the county of Hartford and State of Connecticut, have invented certain new and useful Improvements in Calculating Machines, of which the following is a specification.

My invention relates to calculating machines and especially to clearance proof mechanism for such machines.

My invention has for its principal object to provide an improved construction of feeler device for the clearance proof mechanism of calculating machines.

To the above and other ends which will hereinafter appear, my invention consists in certain features of construction and combinations and arrangements of parts, all of which will be fully set forth herein and particularly pointed out in the claims.

In the accompanying drawings.

Figure 1:
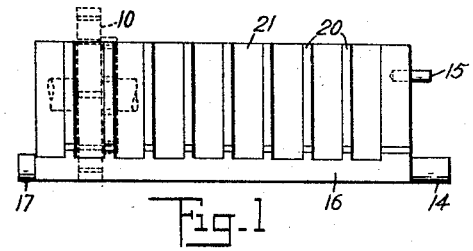
Figure 1 is an elevation of a feeler comprising a series of fingers and made in accordance with my invention.

The feeler device of my invention may be useful in various situations, but the particular form of it shown in the drawing was more especially designed for use in connection with a clearance proof mechanism for use with the Remington-Wahl calculating machine, the purpose of the mechanism being to notify the operator whether or not the total has been correctly copied from the totalizer, and the wheels of said totalizer thereby brought to zero.

Figure 8:
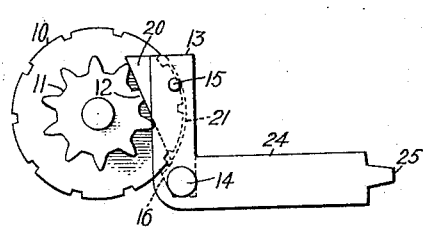
Figure 8 is a diagrammatic view of the whole device in operative position in connection with the register wheels.

The totalizer comprises a series of register wheels 10, each having rigid therewith a pinion 11, one tooth 12 of said pinion being made shorter than the rest and so situated that when the wheel indicates zero at the sight opening, said short tooth occupies the position shown in Fig. 8. There is a series of these wheels 10, and when all of said wheels stand at zero the feeler device 13, which is pivoted in the framework of the totalizer at 14, can occupy the position shown in Fig. 8; but if any one of said wheels stands at some other digit than zero, one of the long teeth of its pinion 11 will occupy the position occupied by the short tooth in Fig. 8, and the feeler device will be forced toward the right.

In mechanism such as that of the Remington-Wahl totalizer, the register wheels are small and the space between them is slight, the pinions 11 projecting but a little way to the side of each wheel 10. It is necessary, therefore, that the fingers of the feeler device be thin and, as the whole device is small, considerable difficulty has been experienced in manufacturing these feeler devices. In a feeler device for use in the Remington-Wahl machine, the fingers 20 have a thickness of about twenty one-thousanths (.020) of an inch. The best way to make the device is to produce the fingers by milling out the spaces between them; but this has proved to be a difficult operation on account of the thinness of the fingers, there being not enough stock left in them to enable them to withstand the action of the milling cutters. The fingers are apt to get caught and to be crumpled up and torn out by said cutters. By the present invention I have overcome these difficulties and am able to manufacture a device of this character easily and satisfactorily.

Figure 3:
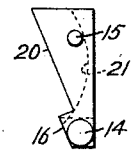
Figure 3 is a right-hand end view of Figure 1.
Figure 2:
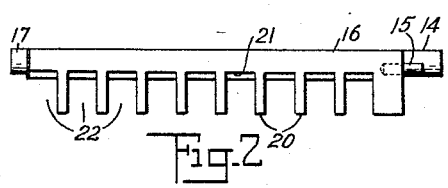
Figure 2 is a view of the same from the top of Figure 1.
Figure 4:
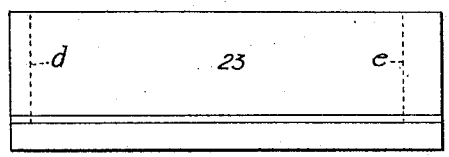
Figure 4 is a face view.

A preferred form of the complete feeler device is shown in Figs. 1, 2 and 3 and, except for a certain dowel pin 15, it is all made of one integral piece of metal. This comprises a longitudinal base-bar 16 having two trunnions 14 and 17 at its ends, a series of fingers 20 and a wall or web 21 joining all of said fingers at the back, the spaces 22 between the fingers being milled out. In manufacturing this device I may begin with a bar of metal having the cross section shown in Fig. 5 comprising a flat side *a* which may be called the back of the device, a front surface *b* made at an inclination to the face *a* whereby the upper part of the cross section is wider than the lower part, and the lower part *c* of the bar being of prismatic form thick enough to act as a sort of rock shaft. This bar may be produced by milling off a bar originally of rectangular cross section; but in regular manufacture the metal can be rolled to approximately the section shown in Fig. 5 so that no machining or grinding is necessary further than enough to give a true surface to the front face *b*. The totalizers of the Wahl machine are of different widths and the bar above described may be sawed off into lengths such for example as shown in Fig. 4, suitable for the particular size of totalizer to be provided for. In the present instance I have shown a bar with nine cut-outs 22 to accommodate nine register wheels if said wheels are arranged for numbers written in solid form. Other totalizers may contain more or less wheels than this number and in providing for such other totalizers the bars 23 would be cut of different lengths.

Figure 5:
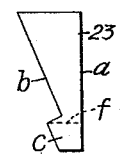
Figure 5 an end view of a piece of metal from which the feeler device is made and showing in dotted lines a step in the construction thereof.

The next step in the manufacture is to mill off the upper part of each end of the bar 23 along the lines *d* and *e* of Fig. 4 and down to line *f* of Fig. 5. This shortens the upper part of the bar but leaves the part *c* projecting at the ends for the formation of the trunnions 14 and 17.

Figure 6:
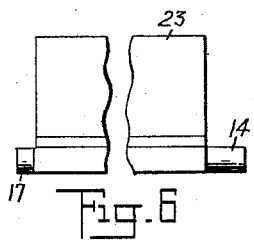
Figure 6 is a front view.
Figure 7:
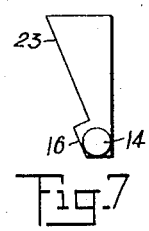
Figure 7 an end view of the device after the next step in its manufacture.

The next step in the manufacture is to make these trunnions round as shown in Figs. 6 and 7. This is done by cutting away the projecting ends of the bar as shown in Fig. 4 with a hollow mill that leaves a round stud or trunnion inside of the tool. It will of course be understood that pivot holes can be drilled in the ends of the feeler piece instead of making trunnions.

The next step in the manufacture is to mill out the grooves 22. This is done by taking the piece as shown in Figs. 6 and 7 and clamping it in the vise of a milling machine and cutting out the grooves 22 with a milling cutter or a gang of cutters. These cutters are not allowed to go clear through the metal from front to back but stop short of the back of the bar. The effect of this is that at all times during the cutting operation each of the fingers 20 is connected with the solid metal throughout its length so that there is never any but a slight length of thin metal projecting between the milling cutters. I have found that by cutting in from the front, that is to say, from the left in Fig. 3, and stopping the cutting operation short of going clear through the bar, that is to say, by leaving the wall 21 in the finished device, the fingers 20 are able to stand the operation without crumpling up and getting torn out. Moreover, after the device is completed the fingers are much stronger and stiffer than they would be if they projected merely from the rock shaft part *c* of the bar and were free throughout their lengths. Leaving the wall 21 at the back of the bar not only greatly simplifies the problem of making this feeler device but it also greatly improves it after it is made, because it prevents accidental bending of what would otherwise be the free ends of the fingers. It is not essential in all instances that the part which I have called the rock shaft *c* be left, the back wall 21 being the essential feature.

In the machine for which the particular device shown in the drawings was designed, there is a certain space between the last register wheel at the right of the series and the casing of the totalizer which allows me to make the right-hand one of the fingers 20 of greater thickness than the other fingers.

The feeler device can be connected up with other mechanism in a variety of ways suitable for the particular machine in which it is to be used. In Fig. 8 I have shown it connected with a bell crank 24 having a tooth 25 at its ends, this being a part of the clearance proof mechanism shown and described in the pending application of Arthur F. Poole, filed April 19, 1921, Serial No. 462,628. This bell crank has a hole through it at its angle into which the trunnion 14 is inserted and one arm of the bell crank is rigidly connected with the comb piece by the dowel pin 15. In order to provide space for this bell crank the right-hand trunnion 14 is made longer than the trunnion 17. Said trunnion 17 in the assembled machine is pivoted in a hole in the left-hand casing plate and the outer end of the trunnion 14 where it projects beyond the bell crank 24 is similarly pivoted in the right-hand frame plate.

In the Remington machine and in some other calculating machines a space is sometimes left in the series of register wheels for punctuation. For example, when the machine is intended to be used for adding amounts in United States money the third space from the left usually has no number wheel in it. Under these conditions one of the fingers 20 could be omitted if desired, but there is no advantage in omitting it, it being generally simpler to cut all of the grooves alike. Moreover, the same milling cutter or gang of cutters can be used for different widths of totalizer. Said cutter or gang of cutters can be made of a length great enough for the largest size totalizer, and in cutting a feeler piece for a smaller size totalizer it will merely happen that some of the cutter wheels will not have any work to do.

Various changes can be made in the details of the device without departing from my invention.

What I claim as new and desire to secure by Letters Patent, is:—

1. In a calculating machine, a feeler piece consisting of an integral bar of metal with grooves milled in it so as to leave a back wall with integral feeler fingers projecting forward from said wall, said wall extending lengthwise of said fingers.

2. In a calculating machine, a feeler piece consisting of an integral bar of metal with grooves milled in it so as to leave a back wall with integral feeler fingers projecting forward from said wall, said wall extending lengthwise of said fingers, and integral trunnions turned on the ends of said device.

3. In a calculating machine, a feeler piece consisting of an integral bar of metal with grooves milled in it so as to leave a base-part and a back wall with integral feeler fingers projecting upward from said base-part and forward from said wall.

4. In a calculating machine, a feeler piece consisting of an integral bar of metal with grooves milled in it so as to leave a base-part and a back wall with integral feeler fingers projecting upward from said base-part and forward from said wall, and integral trunnions turned on the ends of said device.

5. In a calculating machine, a feeler device consisting of a single integral piece of metal having a back wall 21, a bar part 16 with trunnions 14, 17 at its ends and feeler fingers 20 consisting of a series of thin webs projecting forward from the wall 21.

Signed at the borough of Manhattan, city of New York, in the county of New York and State of New York, this 29th day of June, A. D. 1921.

FREDERICK A. HART.

Witnesses:
CHARLES E. SMITH,
E. M. WELLS.